United States Patent [19]
Kremer

[11] 3,783,286
[45] Jan. 1, 1974

[54] X-RAY IMAGE BRIGHTNESS STABILIZER

[75] Inventor: Phillip A. Kremer, Parma, Ohio

[73] Assignee: Picker Corporation, Cleveland, Ohio

[22] Filed: Dec. 23, 1970

[21] Appl. No.: 101,095

Related U.S. Application Data

[63] Continuation of Ser. No. 720,280, April 10, 1968, abandoned.

[52] U.S. Cl............. 250/401, 250/409, 250/410
[51] Int. Cl............. G03b 41/16, H05g 1/60
[58] Field of Search............ 250/65 R, 95, 103

[56] References Cited
UNITED STATES PATENTS

2,972,681   2/1961   Lusby et al. ................... 250/65
3,424,901   1/1969   Kok ............................. 250/103 X

*Primary Examiner*—William F. Lindquist
*Attorney*—Watts, Hoffmann, Fisher & Heinke

[57] ABSTRACT

Image intensifier brightness for both cine and fluoroscopic use is controlled by varying X-ray tube filament current. In cine operation, brightness is integrated over each time interval that the camera shutter is opened, and, while the shutter is next closed, the integral is compared with a standard. Comparison output current controls X-ray tube filament curent. In fluoroscopic operation, a signal proportional to brightness is continuously compared to a standard and the X-ray tube filament current is varied in accordance with the comparison.

53 Claims, 3 Drawing Figures

X-RAY IMAGE BRIGHTNESS STABILIZER

This application is a continuation application of application Ser. No. 720,280, filed Apr. 10, 1968, now abandoned.

BACKGROUND OF THE INVENTION

1. Field of the Invention

This invention relates to X-ray apparatus adapted for cine and fluoroscopic operation, and, more particularly, to such apparatus embodying a novel control for stabilizing image brightness in both modes of operation by controlling X-ray source filament current.

2. Description of the Prior Art

Various methods of controlling the exposure of a subject to radiation from an X-ray source are known from the prior art. It is known to arbitrarily set the amount of current through the X-ray tube and to terminate the exposure at a predetermined time by means of a timer. In this method, the milliampere-seconds (MAS) of radiation to which the subject is exposed is predetermined by the experience of the operator. U.S. Pats., No. 3,284,631 issued Nov. 8, 1966, and No. 3,356,847 issued Dec. 5, 1967, disclose a method of digitizing the MAS and terminating the exposure when the MAS value has reached a predetermined level.

It is also known to use a phototube adjacent the X-ray sensitive film on which the image of a subject is formed to provide a measure of the amount of radiation passing through the subject to the film. Current through the phototube, which is proportional to the radiation falling on the phototube, may be digitized and the exposure terminated when a predetermined number of digital signals have been received. This arrangement is also disclosed in U.S. Pat. No. 3,356,847.

Advances in X-ray technology have recently resulted in the provision of a system utilizing an image intensifier and adapted for both fluoroscopic and cine operation. Such a system uses an optical arrangement focused on an output phosphor of the image intensifier tube, and a half-silvered mirror or the like to provide images of the image intensifier output phosphor both to a cine camera and to a viewer. The cine camera is provided with a commutator on its shutter, which is adapted to provide a shutter signal to the X-ray tube high voltage control circuit, so that the X-ray tube is energized only when the cine camera shutter is open. Generally, an X-ray exposure is made during at least a portion of each open period of the cine camera shutter. The X-ray exposure may be considerably shorter than the period of time during which the shutter is opened. The duration of the X-ray exposure may be determined by known means that measure the MAS of exposure. However, it is altogether possible that the MAS preselected by the operator of the apparatus may be insufficient to provide a brightness suitable for cine photography. For example, the time duration selected for the exposure may be longer than the time the shutter is open for each picture frame. This has lead to much trial and error in an effort to determine the proper brightness of the image to provide a satisfactory photograph. Also, the required MAS to provide an image of proper brightness for photographing may vary as portions of a subject of varying density or thickness are X-rayed. This requires the attention of the radiologist to readjust the MAS and interferes with his other duties.

Accordingly, it is a general object of the present invention to provide a system for maintaining a constant predetermined brightness at the output of an X-ray image intensifier for both fluoroscopic and cine use.

SUMMARY OF THE INVENTION

In a preferred embodiment, a photomultiplier tube is interposed in the optical path of visible radiation emanating from an output phosphor of an image intensifier tube. In a cine mode of operation, the output current of the photomultiplier tube is integrated over each interval that the camera shutter is opened. When the shutter is closed between frames, the output signal of the integrator is sampled and compared with a reference signal. A comparison signal, which is proportional to the difference between the integrated brightness signal and the reference signal, is provided to output means, which provide a control signal to a filament supply circuit of the X-ray source to vary the amount of current through the X-ray source in accordance with the comparison signal. Thus, the brightness of the image intensifier output phosphor is maintained constant.

In the fluoroscopic mode of operation, the output signal of the photomultiplier tube is continuously monitored and continuously compared against the reference signal. Consequently, the filament current of the X-ray source is continuously varied to provide constant brightness on the output phosphor of the image intensifier tube.

Apparatus embodying the invention includes two monostable multivibrators. One of the multivibrators operates to disable the comparator during each period that the shutter is open, and to enable it during at least a portion of each succeeding period when the shutter is closed to compare the integrated brightness of the previous image with the reference value. The other multivibrator provides a short output pulse, which serves to discharge the integrating device at the beginning of each camera exposure frame. In fluoroscopic operation, the multivibrators are not utilized, inasmuch as a continuous comparison is made between the image intensifier image brightness and the reference value.

DESCRIPTION OF A PREFERRED EMBODIMENT

Figure 1:
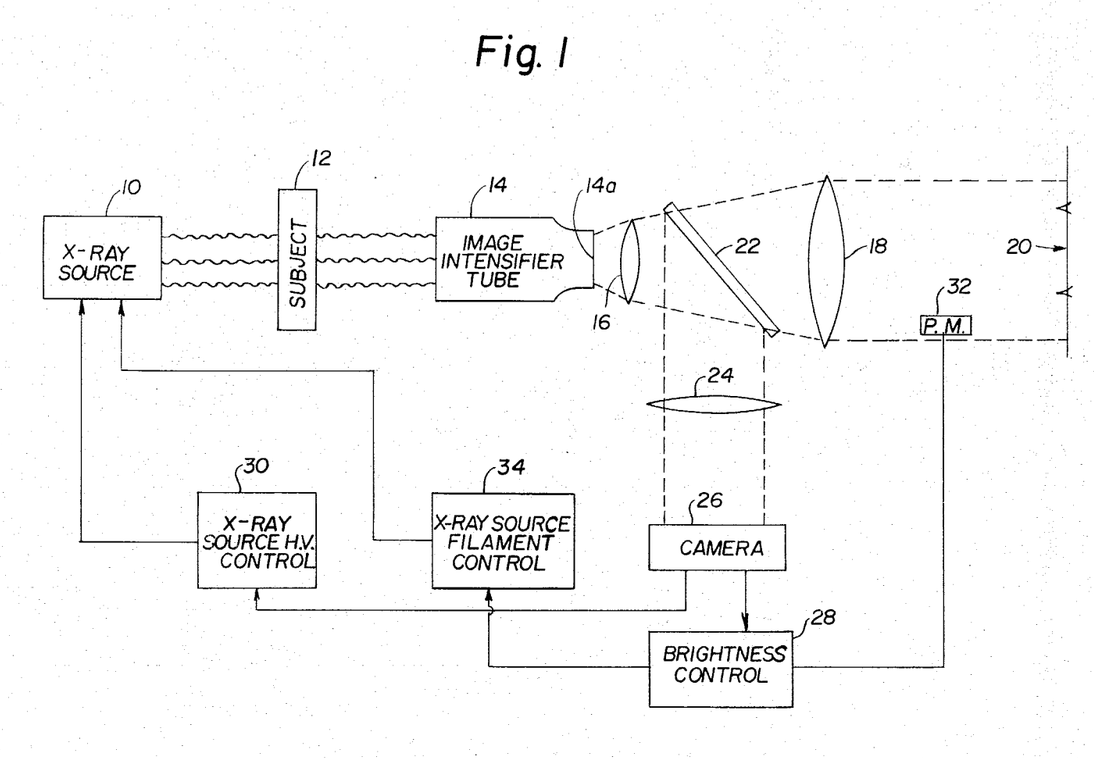
FIG. 1 is a combined schematic and block diagram of an X-ray system embodying the invention.

FIG. 1 shows a typical system in which the present invention may be embodied. An X-ray source 10 having a conventional filament and an anode produces X-rays which impinge upon a subject 12, thus casting a shadow image of the subject of an input to an image intensifier tube 14. The image intensifier tube 14 provides a visible image on an output phosphor 14a. The output image on the phosphor 14a is optically coupled through an objective lens 16 and a field lens 18 to a viewer, illustrated diagrammatically at 20, for fluoroscopic operation. A partially reflective and transmissive device, such as half-silvered mirror 22, interposed between the objective lens 17 and the field lens 18 transmits the image to the viewer and at the same time reflects the image through a second field lens 24 to a cine camera 26. The system thus far described is wellknown in the art. It may be operated in a fluoroscopic mode of operation with continuous energization of the X-ray source, or it may be operated with intermittent energization in a photographic mode of operation, depending on whether or not the cine camera 26 is energized.

The camera 26 is conventional in nature, except that it is provided with a commutator (not shown), which provides a shutter signal to a brightness control 28 and to a conventional X-ray source high voltage control 30. The X-ray source high voltage control 30 serves to provide high voltage to energize the X-ray source 10. The control 30 may energize the X-ray source 10 under control of an operator during fluoroscopic operation, or automatically in cine operation only while the shutter of the camera 26 is open; that is, once each frame. A photomultiplier tube 32 is interposed in the optical path and provides to the brightness control 28 a signal proportional to the overall or average brightness of the output phosphor 14a of the image intensifier tube 14. In response to that signal, the brightness control 28 provides a control signal to a conventional X-ray source filament energizing and control circuit 34 to vary the current through the filament of the X-ray source 10. This, of course, varies the X-ray source current and thus the amount of radiation emitted by the X-ray source. It is understood that the anode and cathode of the X-ray source 10 are connected to opposite ends of the high voltage source, so that high voltage is applied between the anode and cathode in the usual manner.

Figure 2:
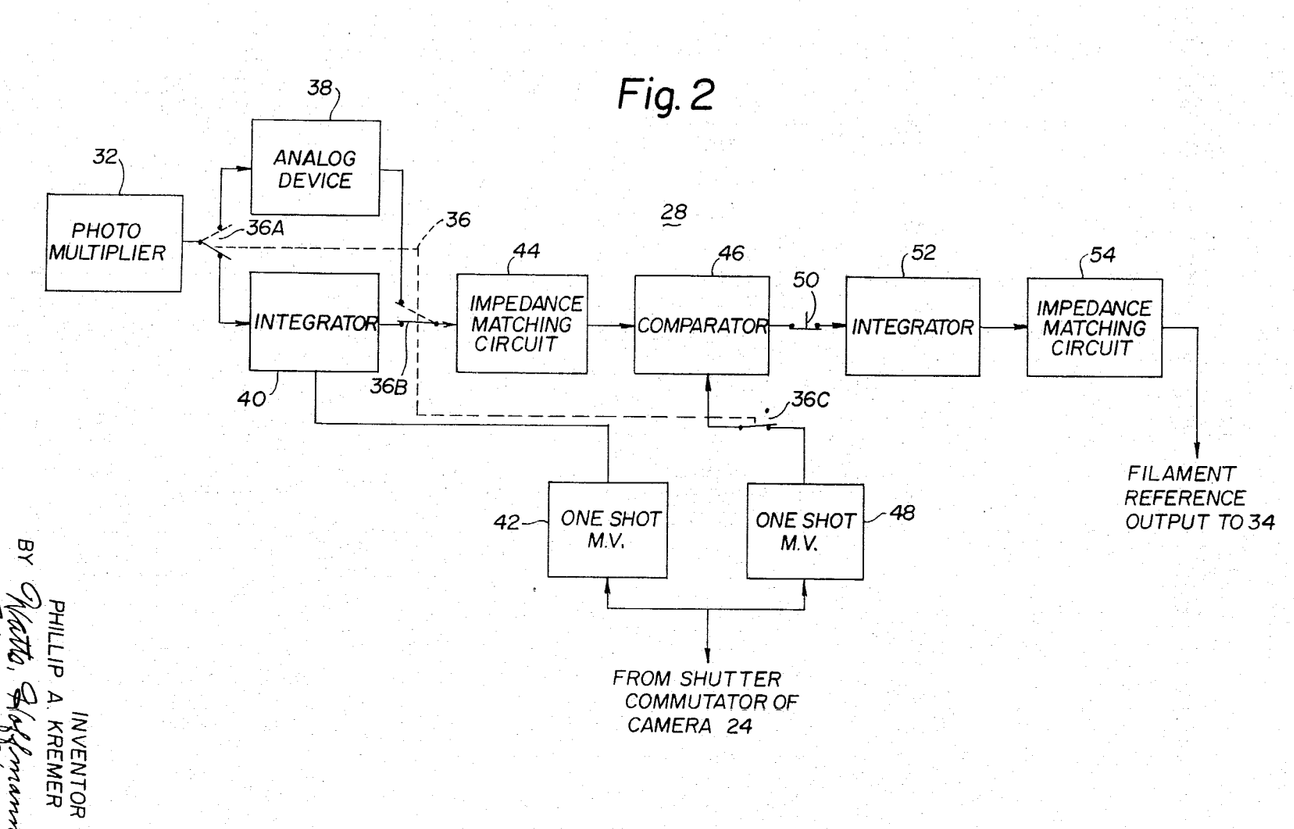
FIG. 2 is a block diagram of a brightness stabilizer embodying the invention.

FIG. 2 is a block diagram of the brightness control 28 that provides a signal to the X-ray source filament energizing and control circuit 34 shown in FIG. 1. The photomultiplier tube 32 provides a signal on the pole of a single-pole, double-throw switch section 36A of a three-section switch 36 that is proportional to the overall or average brightness of the image appearing on the output phosphor 14a of the image intensifier tube 14 (FIG. 1). One contact of the switch 36A is connected to the input of an analog device 38, and the other contact of the switch is connected to the input of a first integrator 40. When the switch 36A is in the position shown, the integrator 40 provides an output signal that is proportional to the time integral of the current through the photomultiplier 32. When the switch 36A is in its second position (shown in broken lines), the analog device 38 provides a continuous output signal that is proportional to the photomultiplier current. The output of the first integrator 40 is connected to one contact of a second switch section 36B of the switch 36, and the output of the analog device 38 is connected to a second contact of the switch section.

When the switch section 36A is in the position shown, the integrator 40 continuously receives a signal from the photomultiplier 32. However, the integrator is discharged at the beginning of each shutter-open period of the camera 24. This control function is provided by a monostable or one-shot multivibrator 42, which is triggered by a signal from the shutter commutator (not shown) of the camera 24. The output of the one-shot multivibrator 42 is a pulse of very short duration, which does not interfere with the operation of the integrator during each exposure period.

The output of the analog device 38 or of the integrator 40, depending on the positions of the switch sections 36A, 36B, is provided as input to an impedance matching circuit 44. The output of the impedance matching circuit 44 is provided to a comparator 46. The comparator 46 serves to compare the input signal from the impedance matching circuit 44 with a reference signal and provides a comparison signal that is proportional to the difference between its two input signals. The comparator 46 is enabled only during those periods of time when the shutter of the camera 24 is closed. However, when the apparatus is operating in its fluoroscopic mode, the comparator 46 is continuously operative.

Control of the comparator 46 in the cine mode of operation is provided by a second monostable or one-shot multivibrator 48. The multivibrator 48 is triggered by a signal from the shutter commutator of the camera 24 to provide a disabling signal to the comparator when the shutter is open. The signal is supplied from the multivibrator 48 to the comparator 46 through a third section 36C of the switch 36. When the equipment is in its fluoroscopic operational mode, the switch section 36C is opened, so that no disabling signal is provided from the multivibrator 48 to the comparator 46 and the comparator 46 operates continuously, as previously noted.

The output of the comparator 46 is supplied through a push-button switch 50 to a second integrator 52. The integrator 52 provides a continuous output signal that varies in accordance with the brightness of the image intensifier tube during the next preceding open period of the shutter of camera 24. The purpose of the switch 50 is to provide means for maintaining a particular X-ray tube current. That is, if the equipment operator finds a particularly suitable or desirable X-ray tube current, he can maintain that level by opening the switch 50. Thus, the last-adjusted X-ray tube current will be maintained until the switch 50 is again closed.

The output of the integrator 52 is provided to an impedance matching circuit 54, the output of which is supplied to the X-ray source filament energizing and control circuit 34 (FIG. 1). The output signal from the impedance matching circuit 54 takes the form of a variable current, which varies above and below a predetermined level in accordance with variations in brightness of the image intensifier tube output phosphor.

Figure 3:
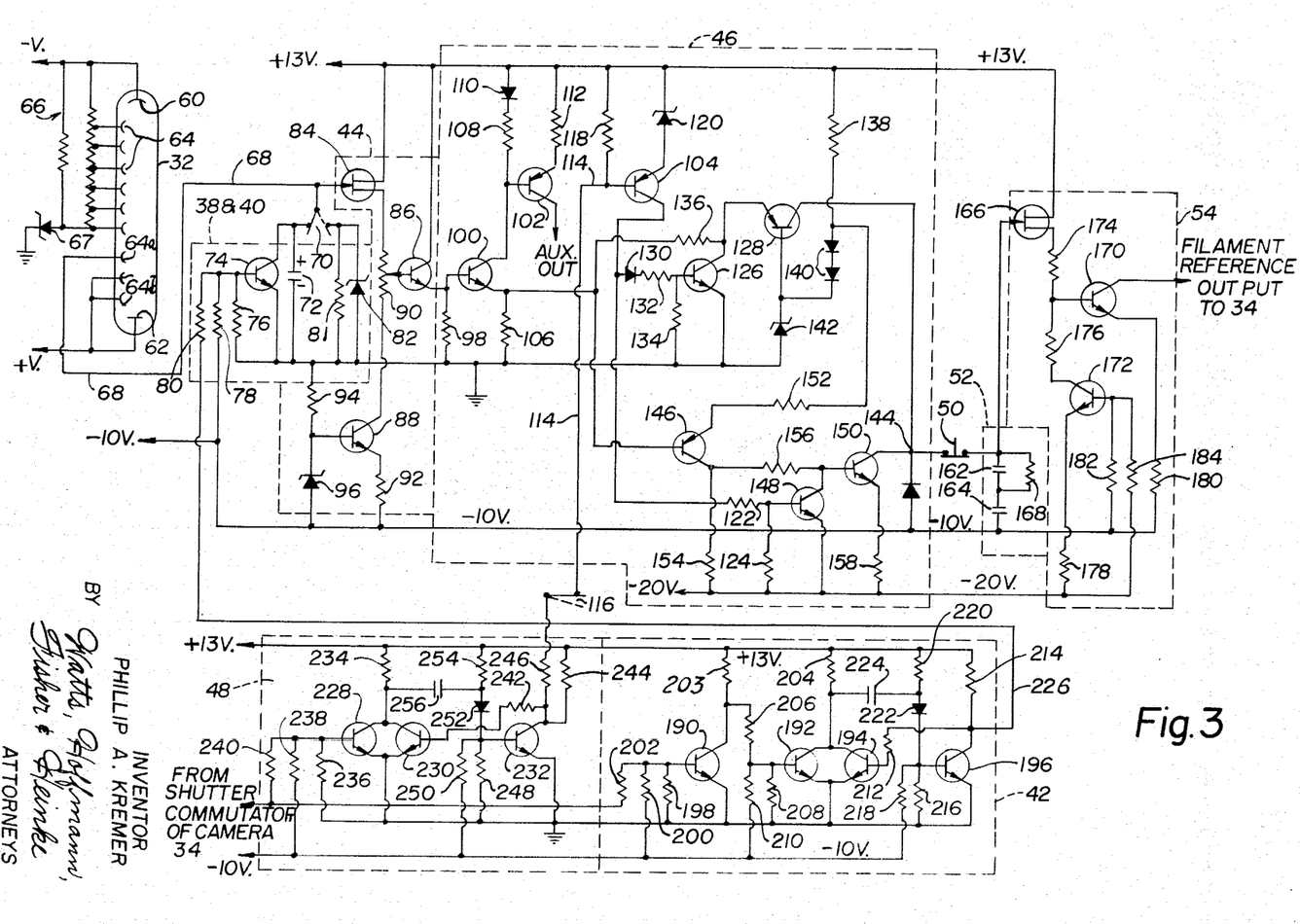
FIG. 3 is a schematic diagram of the brightness stabilizer shown in block form in FIG. 2.

FIG. 3 is a schematic diagram of the brightness control shown in block diagram form in FIG. 2. As shown, the photomultiplier tube 32 is provided with the usual photo cathode 60, anode 62 and a plurality of dynodes 64. The cathode 60 is connected to a source of negative potential (not shown), and successive dynodes 64 are connected to increasingly less negative taps on a voltage divider 66 connected between the source of negative potential and ground through a Zener diode 67. One of the latter dynodes, for example, a dynode 64a, is connected to a lead 68. The last two dynodes 64b are connected together with the anode 62 to a source of positive potential (not shown). The particular connections of the photomultiplier tube 32 are a matter of design choice and are immaterial to the invention, so long as current in the lead 68 is proportional to the intensity of light falling on the photo cathode 60.

The analog device 38 and the integrator 40 shown in FIG. 2 are enclosed within a single block in the schematic diagram FIG. 3. Output current from the photomultiplier tube 32 is supplied to the analog device and to the integrator through a single-pole, double-throw switch 70, the lead 68 being connected to the pole of the switch 70. The switch 70 simultaneously provides the functions of both switch sections 36A, 36B shown in FIG. 2. One contact of the two-contact switch 70 is connected to one side of an integrating capacitor 72 and to the collector electrode of an NPN transistor 74. The other side of the capacitor 72 is grounded, as is the emitter of the transistor. The transistor 74 and the capacitor 72 comprise the integrator 40 shown in FIG. 2. The base of the transistor 74 is connected to ground through a resistor 76, and to a potential source (not shown) of −10 volts through a resistor 78 to provide a negative bias on the base of the transistor and maintain it in a normally non-conductive state. The base of the transistor 74 is also connected through a resistor 80 to the output of the one-shot multivibrator 42 to cause the transistor 74 to become conductive in response to a positive pulse from the multivibrator 42 and rapidly discharge the capacitor 72.

The analog device 38 of FIG. 2 comprises a resistor 81 connected between ground and the second contact of the switch 70, and a Zener diode 82 connected in parallel with the resistor 81. When the switch 70 is in the position shown, the capacitor 72 is charged by current flowing from the photomultiplier tube 32 through the lead 68. When the switch 70 is in the position shown in broken lines, the current through the lead 68 from the photomultiplier provides a continuous signal across the resistor 81. The Zener diode 82 serves merely as a protective device and breaks down if the voltage across the resistor 81 exceeds, for example, 10 volts.

The impedance matching circuit 44 comprises a field effect transistor 84, and two NPN transistors 86, 88. The gate of the field effect transistor 84 is connected to the pole of the switch 70, so that the voltage appearing across the capacitor 72 or across the resistor 81 (depending on the position of the switch 70) is provided to the gate of the transistor 84. The source electrode of the transistor 84 is connected to a potential source (not shown) of +13 volts and its drain electrode is connected through the winding of a potentiometer 90 to the collector of the transistor 88. The emitter of the transistor 88 is connected to the −10 volt source through a resistor 92. The base of the transistor 88 is connected to ground through a resistor 94 and to the −10 volt supply through a Zener diode 96. The transistor 88 having a constant base potential serves as a constant current source for the field effect transistor 84 and the potentiometer 90. Thus, the potential drop across the potentiometer 90 follows the potential appearing across the capacitor 72 or the resistor 81. The movable arm of the potentiometer 90 is connected to the base of the transistor 86. The position of the movable arm of the potentiometer 90 sets the bias for the transistor 86. The collector electrode of the transistor 86 is connected directly to the source of +13 volts, and the emitter of the transistor is connected to ground through a load resistor 98. The voltage appearing across the resistor 98 serves as an input signal to the comparator 46.

The comparator 46 includes an NPN input transistor 100, a PNP auxiliary output transistor 102, and a PNP switching transistor 104. The base of the transistor 100 is connected to the emitter of the transistor 86 in the impedance matching circuit 44 to receive the signal voltage developed across the load resistor 98. The emitter of the transistor 100 is connected to ground through a load resistor 106, and the collector of transistor 100 is connected to the +13 volt supply through a resistor 108 and a diode 110. The base of the auxiliary output transistor 102 is connected to the collector of the transistor 100, and the emitter of the transistor 102 is connected through a load resistor 112 to the −13 volt supply. The collector of the transistor 102 may be connected to supply current to an auxiliary device such as a digitizer or the like utilized in other portions of the control circuitry of the X-ray apparatus.

The purpose of the switching transistor 104 is to disable and enable the comparator 46 alternately when in the cine mode of operation, and to enable it continuously when in the fluoroscopic mode of operation. To this end, the base of the transistor 104 is connected to receive a disabling signal from the one-shot multivibrator 48 on a lead 114 when the cine camera is in operation and its shutter is open. When the signal from the multivibrator 48 is discontinued, the transistor 104 acts to enable the comparator 46. The lead 114 is connected to the multivibrator 48 through a manually-operated switch 116, which is normally closed when the cine camera is in operation. When the cine camera is not in operation, the switch 116 is opened so that no signal reaches the transistor 104 and the comparator 46 is continuously operating. The switch 116 corresponds to the switch section 36C shown in FIG. 2.

The base of the switching transistor 104 is connected through a resistor 118 to the +13 volt supply, and its emitter is connected to that supply through a Zener diode 120. The enabling and disabling output of the transistor 104 is provided on its collector which is connected to a potential source (not shown) of −20 volts through series-connected resistors 122, 124. An NPN transistor 126 controls a PNP transistor 128 that performs a signal comparison. The base of the transistor 126 is connected to receive a signal from the collector of the transistor 104 through a series-connected diode 130 and a resistor 132. The base of the transistor 126 is also connected to ground through a resistor 134. The emitter of the transistor 126 is connected directly to ground, and its collector receives a signal from the emitter of the input transistor 100 through a resistor 136. When the transistor 126 is conductive, that signal is effectively shorted to ground. The collector of the transistor 126 is connected directly to the emitter of the comparison transistor 128. The base of the transistor 128 is connected to the +13 volt supply through a series circuit comprising a resistor 138 and a pair of diodes 140. The base of the transistor 128 is connected to ground through a Zener diode 142, which sets the reference voltage level for the comparison circuit. An output signal from the transistor 128 is taken from the collector, which is connected to a terminal point 144.

The comparator 46 also includes an integrator discharging circuit comprising a PNP transistor 146, and two NPN transistors 148, 150. The transistor 146 also performs a comparison function. Its base is connected to the emitter of the transistor 100 to receive the signal appearing across the load resistor 106. The emitter of the transistor 146 is connected through a resistor 152 to the juncture between the diodes 140 and the resistor 138. Thus, the emitter is maintained at a positive potential determined by the breakdown potential of the Zener diode 142. The collector of the transistor 146 is connected to the −20 volt supply through a load resistor 154 and to the base of the transistor 150 through a resistor 156. The collector of the transistor 148 is also connected to the base of the transistor 150, the emitter of the transistor 148 is connected directly to the −20 volt supply, and its base is connected to the juncture of the resistors 122, 124. The collector of the transistor 150 is connected directly to the juncture point 144, and the emitter of that transistor is connected through a load resistor 158 to the −20 volt supply. The juncture point 144 is also connected to the −10 volt supply through a diode 160.

The second integrator 52 is connected to the juncture point 144 in the comparator 46 through the normally-closed push button switch 50. The integrator 52 comprises a pair of series-connected capacitors 162, 164 connected between the gate electrode of a field effect transistor 166 and the −10 volt source. The side of the switch 50 remote from the juncture point 144 is also connected to the gate of the field effect transistor 166. A resistor 168 is connected across the capacitor 162.

The field effect transistor 166 forms a portion of the second impedance matching circuit 54 along with an NPN output transistor 170 and an NPN constant-current-source transistor 172. The source electrode of the field effect transistor 166 is connected directly to the +13 volt supply, and the drain electrode of that transistor is connected through series-connected resistors 174, 176 to the collector of the transistor 172. The emitter of the transistor 172 is connected through a resistor 178 to the −20 volt supply. The emitter of the transistor 170 is connected to the −10 volt supply through a load resistor 180. The base of the transistor 172 is also connected to the −10 volt supply through a resistor 182 and to the −20 volt supply through a resistor 184. Thus, the base of the transistor 172 is maintained at a constant negative potential between −10 and −20 volts so that the transistor 172 acts as a constant current source for the transistor 166. The output from the impedance matching circuit 54 is taken in the form of a current signal from the collector of the transistor 170 and may be provided to the X-ray source filament energizing and control circuit 34 to control the current through the filament and thus the milliampere current through the X-ray source.

As previously mentioned, control signals are provided by the one-shot multivibrators 42, 48 in response to signals received from the shutter commutator of the cine camera 24. The multivibrator 42 provides a signal of very short duration at the start of each open period of the camera shutter to the transistor 74 to discharge the integrating capacitor 72 and ready it for integrating the output current of the photomultiplier tube 32 over the next frame. That multivibrator comprises four NPN transistors 190, 192, 194, 196. The base of the transistor 190 is connected to ground through a resistor 198 and to the −10 volt supply through a resistor 200. It is also connected to receive a positive signal from the shutter commutator of the camera 24 through an input resistor 202. Because of the voltage divider effect of the resistors 198, 200, the base of the transistor 190 is maintained at a negative potential with respect to the emitter of the transistor which is connected directly to ground. Thus the transistor 190 is normally in a non-conductive condition until a positive signal is received from the shutter commutator. The collector of the transistor 190 is connected through a load resistor 203 to the +13 volt supply.

The base of the transistor 192 is connected to the collector of the transistor 190 through a resistor 206, to ground through a resistor 208, and to the −10 volt supply through a resistor 210. The bias on the base of the transistor 192 maintains that transistor in a normally non-conducting state. The emitter of the transistor 192 is connected directly to the emitter of the transistor 194 and both are connected directly to ground. The collectors of the two transistors 192, 194 are connected together and to the +13 volt supply through a load resistor 204. The base of the transistor 194 is connected through a resistor 212 to the collector of the transistor 196. The collector of the latter transistor is also connected through a load resistor 214 to the +13 volt supply. The emitter of the transistor 196 is connected directly to ground. The base of that transistor is connected to ground through a resistor 216 and to the −10 volt supply through a resistor 218. The base of the transistor 196 is also connected to the +13 volt supply through a resistor 220 and a diode 222 connected in series. The transistor 196 is normally forward biased and hence conducting to maintain its collector substantially at ground potential. Interconnection between the transistors 192, 194, 196 of the multivibrator is provided by a capacitor 224 having one side connected to the collectors of the transistor 192, 194 and its other side connected to the juncture of the resistor 220 and the diode 222. The output from the multivibrator 42 is taken from the collector of the transistor 196 on a lead 226, and is supplied through the resistor 80 to the base of the transistor 74 in the integrator 40.

The multivibrator 48, which provides a signal to the comparator to disable the comparator while the shutter of the camera 24 is open, comprises three NPN transistors 228, 230, 232. The transistors 228, 230 have their collectors connected together and to the +13 volt supply through a load resistor 234. Their emitters are connected together and directly to ground. The base of the transistor 228 is grounded through a resistor 236, and is connected to the −10 volt supply through a resistor 238. The transistor base is also connected to receive a signal from the shutter commutator of the camera 24 through a resistor 240. Because of the negative bias on its base, the transistor 228 is non-conductive in the absence of a positive signal from the shutter commutator. The base of the transistor 230 is connected through a resistor 242 to the collector of the transistor 232. The collector of the transistor 232 is also connected to the +13 volt supply through a load resistor 244, and through a resistor 246 and the switch 116 to the lead 114 into the comparator 46. The emitter of the transistor 232 is connected directly to ground. The transistor base is connected to ground through a resistor 248 and to the −10 volt supply through a resistor 250. The base of the transistor 232 is also connected to the +13 volt supply through a diode 252 and a series-connected resistor 254. That transistor is normally conductive, so that its collector is substantially at ground potential. This causes the transistor 230 to be normally non-conductive.

The photomultiplier tube 32 shown in detail in FIG. 3 operates in conventional manner. Visible radiation falling on the photo-cathode 30 causes electrons to be emitted and atracted to the first dynode 64. Increasing numbers of electrons are attracted to and emitted by succeeding dynodes. The dynode 64a emits more electrons toward the dynodes 64b and the anode 62 than it receives from the next preceding dynode 64 and is, therefore, positive with respect to ground. Thus, current flows through the lead 68 from the dynode 64a into either the analog device 38 or the integrator 40, depending on the position of the switch 70.

In considering the operation of the brightness control shown schematically in FIG. 3, assume first that it is in a cine mode of operation, with the switch 70 in the position shown and with the switch 116 closed. Assume further that the camera shutter is open, that the capacitor 72 has been previously discharged through the transistor 74, and that the base of the transistor 104 in comparator 46 is low due to the conductive condition of the transistor 232 in the multivibrator 48. Under those assumed conditions, the transistor 74 in the integrator 40 is non-conductive, so that the capacitor 72 is charged by photomultiplier current through the lead 68. As the charge across the capacitor 72 builds up, the gate of the field effect transistor 84 becomes increasingly positive, which increases the voltage drop across the load resistor 90 and thus the voltage on the base of the transistor 86. As current through the transistor 86 increases, the potential on the base of the transistor 100 increases, thus causing current through that latter transistor to increase, and provide an increasingly positive signal across its load resistor 106. As current through the transistor 100 increases, the base of the auxiliary output transistor 102 becomes less positive, thus increasing current through the transistor 102 and input current to the auxiliary equipment connected to the collector of that transistor. The positive-going signal appearing across the load resistor 106 is supplied through the resistor 136 to the collector of the transistor 126 and to the emitter of the transistor 128. That signal is also provided directly to the base of the transistor 146.

It was assumed that the base of the transistor 104 is low, because of the signal appearing on the lead 114. Therefore, the transistor 104 is conducting. Conduction of the transistor 104 has two effects. First, it causes the potential on the base of the transistor 126 to be high with respect to the transistor emitter. This causes the transistor 126 to conduct and, effectively, to short to ground the signal applied to its collector from across the resistor 106. Thus, because the emitter of the transistor 128 is negative with respect to the transistor base, the transistor 128 is nonconductive. It is noted that the base of the transistor 128 is maintained at a preselected positive potential by virtue of the Zener diode 142 connected between its base and ground. The breakdown potential of the Zener diode 142 determines the brightness level on the output of the image tube shown in FIG. 1. Of course, various Zener diodes having desired breakdown potentials may be utilized in various applications.

The second effect caused by conduction of the transistor 104 is to maintain the potential at the base of the transistor 148 positive with respect to the transistor emitter potential. Therefore, the transistor 148 is conductive, which maintains the base of the transistor 150 at a low potential. Because the base of the transistor 150 is very close to the emitter potential, the transistor 150 is non-conductive. This means that there is effectively no discharge path for the capacitor 164, and it will retain whatever charge it has attained during its last preceding charging or discharging cycle.

The potential appearing at the top of the series-connected capacitors 162, 164 in the integrator 52 is applied to the gate of the field effect transistor 166. The level of this potential determines the degree of conduction of the transistor 166 and hence the potential applied to the base of the transistor 170. The transistor 172 serves merely as a constant current source for the field effect transistor 166, and operates in conventional fashion. The potential on the base of the transistor 170 controls the degree of conduction of that transistor and hence the filament reference current supplied to the filament control 34 shown in FIG. 1. It is apparent that that current will remain constant at a level determined by the charge across the capacitors 162, 164 in the integrator 52 attained during their last charging or discharging period.

When the shutter of the camera closes, a signal is received from the shutter commutator that causes the output signal from the multivibrator 48 on the lead 114 to go high. This places the potential of the base of the transistor 104 above the potential of the transistor emitter, thus causing the transistor 104 to be cut off. This has two effects. First, the potential on the base of the transistor 126 drops to a level below ground, thus cutting off that transistor. When the transistor 126 is cut off, the signal developed across the resistor 106 from the input transistor 100 is applied to the emitter of the transistor 128. When that signal is at a level that is more positive than the base of the transistor 128 (as determined by the breakdown potential of the Zener diode 142), the transistor 128 conducts to provide charging current to the capacitors 162, 164 in the integrator 52. This increases the voltage to the gate of the field effect transistor 166 and increases the current flow through the output transistor 170. Thus, the filament reference output current is decreased to reduce the number of milliamperes of current in the X-ray source during the next exposure period.

It is pointed out that the emitter of the transistor 146 in the comparator 46 is maintained at substantially the same positive potential as the base of the transistor 128. The base of the transistor 146 is connected to receive the signal developed across the resistor 106. Therefore, if the signal developed across the resistor 106 attains a positive level greater than the positive potential on the emitter of the transistor 146, that transistor will remain cut off and its collector potential will be low. This, in turn, causes the base of the transistor 150 to be negative with respect to its emitter and maintains that transistor cut off. On the other hand, if the level of the signal developed across the resistor 106 does not exceed that potential level of the emitter of the transistor 146, the transistor 146 will conduct. This will raise the potential of the base of the transistor 150 causing that transistor to conduct and discharge the capacitors 162, 164. This discharge is terminated at the termination of the signal from the multivibrator 48, which causes the transistor 148 to become conductive and shut off the transistor 150. When the capacitors 162, 164 are discharged to a lower potential level, the potential on the gate of the field effect transistor 166 is lowered, thus resulting in lowering the potential on the base of the transistor 170 and decreasing the filament reference output current through that transistor.

The purpose of the capacitor 162 connected in parallel with resistor 168 and the combination connected in series with the capacitor 164 in the second integrator 52 is to provide rapid correction for large required changes in brightness. The capacitor 162 provides some overshoot in correcting for large changes, but as it discharges through the resistor 168 a stable condition is quickly reached.

The monostable or one-shot multivibrators 42, 48 are effective to control the operation of the brightness control only during the cine mode of operation. As previously mentioned, the multivibrator 48 serves to provide a signal through the switch 116 on the lead 114 to the comparator 46 to cause it to compare the output of the integrator 40 to a reference signal during a portion of that period when the cine camera shutter is closed. The multivibrator 42 serves to provide a very short duration positive pulse to the base of the transistor 74 in the integrator 40 to discharge the capacitor 72 very rapidly at the beginning of each open period of the shutter of the cine camera. Also as previously mentioned, the cine camera 24 (FIG. 1) is provided with a shutter commutator. A positive signal is provided through the shutter commutator when the shutter is closed, and the commutator provides an open circuit when the camera shutter is open.

When the system is in cine operating mode, the switch 116 is closed and the operability of the comparator 46 is controlled by the condition of the transistor 232 in the multivibrator 48. The multivibrator 48 is a conventional monostable device, and hence will be described only briefly. When the camera shutter is open and no signal is being received on the base of the transistor 228 through the resistor 240, the transistor 228 is non-conductive because of the negative bias on its base derived from the voltage divider comprising the resistors 236, 238. The transistor 232 is normally on, because its base potential, derived through the voltage divider comprising resistors 248, 250, 254 and diode 252, is positive with respect to its emitter potential. This places the base of the transistor 230 essentially at ground potential and that transistor is non-conductive. When the transistor 232 is on, the base of the transistor 104 in the comparator 46 is low and so the transistor 104 is on. As previously pointed out, this causes the comparator 46 to be inoperative.

When a positive signal is received from the shutter commutator, indicating that the camera shutter is closed, the base of the transistor 228 is driven positively to turn on that transistor. When the transistor 228 turns on, its collector potential drops and this drop in potential is transferred through the capacitor 256 to the base of the transistor 232. This causes the transistor 232 to turn off, thus raising its collector potential and transmitting a high signal to the base of the transistor 104 in the comparator 46. This turns off the transistor 104 and makes the comparator 46 operative until the transistor 232 again becomes conductive. The high potential on the collector of the transistor 232 is transferred to the base of the transistor 230, which turns on the latter transistor. As the capacitor 256 discharges through the resistors 234, 254, the potential on the base of the transistor 232 rises until that transistor again turns on. This lowers its collector potential, which potential is transmitted to the base of the transistor 104 in the comparator 46 and causes the latter transistor again to turn on. The drop in potential of the collector of the transistor 232 also causes the transistor 230 to turn off, although the transistor 228 still remains on. The transistor 228 will remain on until the termination of the positive signal from the shutter commutator. The time constant of the circuit comprising the resistors 234, 254 and the capacitor 256 is so chosen through proper circuit values as to cause the transistor 232 to remain off and provide a positive output pulse on the lead 114 for a period of approximately 8 milliseconds. In the usual mode of operation of a system embodying the invention, the cine camera is adapted to operate at frame rates of 60, 30, 15, and 7½ frames per second. This means that if the enabling output pulse of the multivibrator 48 is approximately 8 milliseconds long, it is slightly shorter than the closed period of the camera shutter at its fastest frame per second rate.

It is noted that the purpose of the diode 252 is to prevent the base-emitter junction of transistor 232 from breaking down.

As previously noted, the purpose of the multivibrator 42 is to provide a short positive pulse to the transistor 74 in the integrator 40 at the beginning of each open frame of the camera shutter. The multivibrator 42 is identical to the multivibrator 48 previously described except for the use of the input transistor 190. The transistor 190 is utilized because it is desired to have transistor 196 provide its positive output pulse when the shutter opens, rather than when it closes as in the case of the multivibrator 48. To this end, when the shutter of the camera is closed, the positive signal provided to the base of the transistor 190 through the input resistor 202 maintains the transistor 190 in a conductive or on condition. Thus, the collector of the transistor 190 is maintained near ground potential, which maintains the transistor 192 in an off condition when the camera shutter is closed. The transistor 196 is on, so that a low signal is provided to the transistor 74 in the integrator 40 to maintain that transistor in a non-conductive state. When the camera shutter opens and the signal is removed from the base of the transistor 190, the transistor 190 turns off. This causes the collector of the transistor 190 to rise in potential thus turning on the transistor 192. When the transistor 192 turns on, its collector potential drops and this drop in potential is transferred through the capacitor 224 to the base of the transistor 196. This causes the transistor 196 to turn off, and its collector potential to rise to approximately +13 volts. Thus, a positive pulse is provided on the lead 226 to the base of the transistor 74 in the integrator 40 to turn on that transistor and rapidly discharge the capacitor 72. The transistor 196 remains turned off until the capacitor 224 discharges through the resistors 204, 220, at which time its base potential rises and it again turns on. This causes the potential of the collector of the transistor 196 to drop and causes the transistor 194 to turn off. At this time the transistor 192 is still on and remains in that condition until the shutter closes and the transistor 190 turns on. As previously noted, the positive output pulse from the multivibrator 42 to the integrator 40 is approximately 100 milliseconds in duration. This is sufficient to discharge the capacitor 72 completely through the very low impedance of the transistor 74.

In the fluoroscopic mode of operation, the switch 70 is changed to its position shown in dotted lines so that input current from the dynode 64a of the photomultiplier tube 32 flows continuously through the resistor 80 in the analog device 38. Likewise, the switch 116 is open so that the comparator 46 is not disabled periodically as in cine operation. Otherwise, the operation of the brightness control shown in FIG. 3 is very similar to the operation previously described with respect to the cine mode of operation. It is apparent that in the fluoroscopic mode a signal will be continuously developed across the resistor 80 that is proportional to the average or overall brightness of the image provided by the output phosphor of the image intensifier tube 14. (FIG. 1). That signal, through the impedance matching circuit 44, continuously energizes the comparator 46 to provide an output signal to charge or discharge the capacitors 162, 164 in the second integrator 52 in accordance with the value of the brightness signal when compared to the reference signal provided internally in the comparator 46. Thus, the filament reference output current through the transistor 170 in the impedance matching circuit 54 may vary to adjust the filament current of the X-ray source to maintain the brightness of the image intensifier image constant.

It is pointed out that the auxiliary output from the collector of the transistor 102 in the comparator is particularly valuable in operating in the fluoroscopic mode. That transistor provides a current signal that is continuously proportional to the milliamperes of X-ray radiation emitted by the source 10. Thus, the output of the transistor 102 may be provided to a digitizer, such as that shown in U.S. Pat. No. 3,356,847, and the output of the digitizer utilized to terminate the X-ray exposure when the subject has received a predetermined amount of radiation.

The push button switch 50 interposed between the comparator 46 and the second integrator 52 may also be advantageously used during fluoroscopic examination. If a particularly suitable level of intensity has been found in examining a portion of the subject's body, for example, that level of radiation may be maintained while examining a denser or less dense portion of the subject merely by opening the switch 50. This causes the charge across the capacitor 164 to be maintained and thus maintains constant the filament reference of output current from the transistor 170.

Although a preferred embodiment of the invention has been shown and described, it is apparent that many changes and modifications may be made therein by one skilled in the art that fall within the true scope and spirit of the invention defined by the appended claims.

I claim:

1. In an X-ray system having an X-ray source with a filament connected to an energizing and control circuit, the X-ray source providing X-rays to a subject to be X-rayed and to an image intensifier positioned behind the subject relative to the X-ray source for converting an X-ray image of the subject into a visible image, and having a cine camera for taking pictures of the visible image, the camera having shutter means with alternately open and closed periods, a control for stabilizing brightness of the visible image comprising:
   a. a light-responsive means located adjacent the image intensifier for providing a first signal proportional to instantaneous brightness of the visible image;
   b. first integrator means selectively responsive to said first signal for providing a second signal proportional to brightness of the visible image integrated over each shutter open period;
   c. analog means selectively responsive to said first signal for providing a third signal proportional thereto;
   d. circuit means for developing a constant level reference signal having a value representative of a desired image brightness level;
   e. comparator means selectively connectable to receive one of said second and third signals and coupled to said circuit means for comparing said one signal with said constant level reference signal proportional to a desired image brightness level to provide a comparison signal proportional to a difference between said one signal and said reference signal; and,
   f. output means for receiving said comparison signal and providing to the X-ray source filament energizing and control circuit a control signal that varies in proportion to said comparison signal to thereby produce a visible image having a constant brightness.

2. The system of claim 1, wherein said output means comprises second integrator means.

3. The system of claim 1, wherein said control signal is provided continuously.

4. The system of claim 1, wherein said output means comprises second integrator means, and said control signal is provided continuously.

5. The system of claim 4, further including discharge means for discharging said first integrator means intermittently in synchronism with operation of the shutter means.

6. The system of claim 4, further including switch means for enabling said comparator means continuously when said comparator means is connected to receive said third signal and gating means for enabling said comparator means intermittently in synchronism with operation of the shutter means when said comparator means is connected to receive said second signal.

7. The system of claim 6, wherein said gating means disables said comparator means during each shutter open period, and enables said comparator means during at least a portion of each shutter closed period, when said comparator is connected to receive said second signal.

8. The system of claim 7, further including discharge means for discharging said first integrator means intermittently in synchronism with operation of the shutter means.

9. The system of claim 8, wherein said first integrator means is discharged while said comparator means is disabled.

10. The system of claim 6, further including discharge means for discharging said first integrator means intermittently in synchronism with operation of the shutter means.

11. The system of claim 1, further including switch means for enabling said comparator means continuously when said comparator means is connected to receive said third signal and gating means for enabling said comparator means intermittently in synchronism with operation of the shutter means when said comparator means is connected to receive said second signal.

12. The system of claim 11, wherein said gating means disables said comparator means during each shutter open period, when said comparator is connected to receive said second signal.

13. The system of claim 12, wherein said gating means also enables said comparator means during at least a portion of each shutter closed period, when said comparator is connected to receive said second signal.

14. The system of claim 13, further including discharge means for discharging said integrator means intermittently in synchronism with operation of the shutter means.

15. The system of claim 14, wherein said integrator means is discharged while said comparator means is disabled.

16. The system of claim 11, further including discharge means for discharging said integrator means intermittently in synchronism with operation of the shutter means.

17. The system of claim 1, further including discharge means for discharging said integrator means intermittently in synchronism with operation of the shutter means.

18. In an X-ray system having an X-ray source with a filament connected to an energizing and control circuit, the X-ray source providing X-rays to a subject to be X-rayed and to an image intensifier positioned behind the subject relative to the X-ray source for converting an X-ray image of the subject into a visible image, and having a cine camera for taking pictures of the visible image, the camera having shutter means with alternately open and closed periods, a control for stabilizing brightness of the visible image comprising:
  a. light-responsive means located adjacent the image intensifier for providing a first signal proportional to instantaneous brightness of the visible image;
  b. first integrator means responsive to said first signal for providing a second signal proportional to brightness of the visible image integrated over each shutter open period;
  c. circuit means for developing a constant level reference signal having a value representative of a desired image brightness level;
  d. comparator means connected to receive said second signal and coupled to said circuit means for comparing said second signal with said constant level reference signal to provide a comparison signal proportional to a difference between said second signal and said reference signal;
  e. output means for receiving said comparison signal and providing to the X-ray source filament energizing and control circuit a control signal that varies in proportion to said comparison signal to thereby produce a visible image having a constant brightness.

19. The system of claim 18, wherein said output means comprises second integrator means, and said control signal is provided continuously.

20. The system of claim 19, further including gating means for enabling said comparator means intermittently in synchronism with operation of the shutter means.

21. The system of claim 20, wherein said gating means disables said comparator means during each shutter open period.

22. The system of claim 21, wherein said gating means also enables said comparator means during at least a portion of each shutter closed period.

23. The system of claim 22, further including discharge means for discharging said first integrator means intermittently in synchronism with operation of the shutter means.

24. The system of claim 23, wherein said first integrator means is discharged while said comparator is disabled.

25. The system of claim 19, further including discharge means for discharging said first integrator means intermittently in synchronism with operation of the shutter means.

26. The system of claim 18, further including gating means for enabling said comparator means intermittently in synchronism with operation of the shutter means.

27. The system of claim 26, wherein said gating means disables said comparator means during each shutter open period.

28. The system of claim 27, wherein said gating means also enables said comparator means during at least a portion of each shutter closed period.

29. The system of claim 28, further including discharge means for discharging said integrator means intermittently in synchronism with operation of the shutter means.

30. The system of claim 29, wherein said integrator means is discharged while said comparator is disabled.

31. The system of claim 18, further including discharge means for discharging said integrator means intermittently in synchronism with operation of the shutter means.

32. In an X-ray system having an X-ray source with a filament connected to an energizing and control circuit, the X-ray source providing X-rays to a subject to be X-rayed and to an image intensifier positioned behind the subject relative to the X-ray source for converting an X-ray image of the subject into a visible image, a control for stabilizing brightness of the visible image comprising:
  a. light-responsive means located adjacent the image intensifier for providing a first signal proportional to instantaneous brightness of the visible image;
  b. analog means responsive to said first signal for providing a second signal proportional thereto;
  c. circuit means for developing a constant level reference signal having a value representative of a desired image brightness level;
  d. comparator means connected to receive said second signal and coupled to said circuit means for comparing said second signal with said constant level reference signal to provide a comparison signal proportional to a difference between said second signal and said reference signal; and,
  e. output means for receiving said comparison signal and providing to the X-ray source filament energizing and control circuit a control signal that varies in proportion to said comparison signal to thereby produce a visible image having a constant brightness.

33. The system of claim 32, wherein said first, second and comparison signals are continuously provided.

34. The system of claim 32, wherein said first, second, comparision and control signals are continuously provided.

35. In an X-ray system having an X-ray source with a filament connected to an energizing and control circuit, the X-ray source providing X-rays to a subject to be X-rayed and to an image intensifier positioned behind the subject relative to the X-ray source for converting an X-ray image of the subject into a visible image, and having a cine camera having shutter means with alternately open and closed periods and providing shutter signals indicative of the open and closed periods, a control for stabilizing a brightness of the visible image comprising:
 a. light-responsive means located adjacent the image intensifier for providing a first signal proportional to instantaneous brightness of the visible image;
 b. integrator means selectively connectable to receive said first signal for providing a second signal proportional to the brightness of the visible image integrated over each shutter open period;
 c. analog means selectively connectable to receive said first signal for providing a third signal proportional thereto;
 d. circuit means for developing a constant level reference signal having a value representative of a desired image brightness level;
 e. comparator means selectively connectable to receive one of said second and third signals and coupled to said circuit means for comparing said one signal with said constant level reference signal to provide a comparison signal proportional to a difference between said one signal and said reference signal;
 f. first switch means having a first position for connecting said integrator means to receive said first signal and said comparator means to receive said second signal, and having a second position for connecting said analog means to receive said first signal and said comparator means to receive said third signal;
 g. comparator gating means connected to receive the shutter signals and provide comparator gating signals to said comparator means to disable said comparator means in response to said shutter signals;
 h. second switch means for connecting and disconnecting said comparator gating means and said comparator means;
 i. discharge means connected to discharge said integrator means in response to discharge gating signals;
 j. discharge gating means connected to receive the shutter signals and provide said discharge gating signals to said discharge means in response to said shutter signals; and,
 k. output means for receiving said comparison signal and providing to the X-ray source filament energizing and control circuit a control signal that varies in proportion to said comparison signal to thereby produce a visible image having a constant brightness.

36. The system of claim 35, wherein said output means comprises second integrator means and said control signal is provided continuously.

37. The system of claim 36, wherein said comparator gating means comprises a monostable multivibrator for providing comparator gating signals for disabling said comparator means during each shutter open period and enabling said comparator during at least a portion of each shutter closed period.

38. The system of claim 36, wherein said discharge gating means comprises a monostable multivibrator for providing said discharge gating signals to said discharge means while said comparator means is disabled.

39. The system of claim 36, wherein said comparator gating means provides comparator gating signals for disabling said comparator means during each shutter open period and enabling said comparator during at least a portion of each shutter closed period and wherein said discharge gating means provides said discharge gating signals to said discharge means while said comparator means is disabled.

40. The system of claim 39, wherein said comparator gating means and said discharge gating means each comprise a monostable multivibrator.

41. The system of claim 35, wherein said comparator gating means provides comparator gating signals for disabling said comparator means during each shutter open period and enabling said comparator during at least a portion of each shutter closed period.

42. The system of claim 41, wherein said comparator gating means comprises a monostable multivibrator.

43. The system of claim 35, wherein said discharge gating means provides said discharge gating signals to said discharge means while said comparator means is disabled.

44. The system of claim 43, wherein said discharge gating means comprises a monostable multivibrator.

45. The system of claim 35, wherein said comparator gating means provides comparator gating signals for disabling said comparator means during each shutter open period and enabling said comparator during at least a portion of each shutter closed period and wherein said discharge gating means provides said discharge gating signals to said discharge means while said comparator means is disabled.

46. The system of claim 45, wherein said comparator gating means and said discharge gating means each comprise a monostable multivibrator.

47. In an X-ray system having an X-ray source, an X-ray source control circuit for varying a signal applied to said X-ray source, an imaging means positioned to receive at least a portion of the X-rays emitted by the X-ray source for converting the received X-rays into a visible image, and a control system for stabilizing the brightness of a said visible image and comprising:
 light responsive means disposed to receive light energy emitting from said imaging means for providing a first signal having a value representative of the brightness of a said visible image;
 variable reference signal circuit means for developing a reference signal which may be varied, but upon being set remains at a constant level, the value of said reference signal being representative of a selected image brightness level;
 comparator circuit means connected to said light responsive means and to said reference circuit means for comparing said first signal with said constant level reference signal to provide an error signal representative of a difference between the brightness of said visible image and a selected image brightness level; and,
 output means coupled to said comparator circuit means for applying to the X-ray source control circuit a control signal which varies in accordance with said error signal to thereby produce a visible image having a constant selected image brightness.

48. An apparatus as defined in claim 47 wherein said X-ray source has a filament element and said X-ray source control circuit includes filament circuit means for energizing a said filament element in accordance with the value of a said control signal to thereby maintain a said visible image at a constant brightness.

49. In an X-ray system having an X-ray source, an X-ray source control circuit for varying a signal applied to said X-ray source, an imaging means positioned to receive at least a portion of the X-rays emitted by the X-ray source for converting the received X-rays into a visible image, and a control system for stabilizing the brightness of a said visible image and comprising:

light responsive means disposed to receive light energy emitting from said imaging means for providing a first signal having a value representative of the brightness of a said visible image;

reference circuit means for developing a constant level reference signal having a predetermined value with respect to ground representative of a selected image brightness level;

comparator circuit means connected to said light responsive means and to said reference circuit means for comparing said first signal with said constant level reference signal to provide an error signal representative of a difference between the brightness of said visible image and a selected image brightness level;

output means coupled to said comparator circuit means for applying to the X-ray source control circuit a control signal which varies in accordance with said error signal to thereby produce a visible image having a constant selected image brightness;

a camera disposed to view a said visible image and having a shutter means, and shutter circuit means for opening said shutter means for predetermined time intervals; and, integrator circuit means for receiving a said first signal for providing an integrated signal having a value proportional to the value of the instantaneous brightness of the visible image integrated over each predetermined time interval, and said comparator circuit means being coupled to said integrator circuit means to receive a said integrated signal.

50. A method of stabilizing the brightness of a visible image developed by an imaging device in an X-ray system comprising the steps of:

providing a first signal having a value representative of the brightness of the visible image;

developing a reference signal having a value with respect to ground representative of a visible image brightness;

varying the value of said reference signal to obtain a desired image brightness;

developing an error signal having a value representative of the relative value of the first signal and the reference signal; and, applying a control signal to an X-ray source which varies in accordance with the value of said error signal to thereby produce a visible image of a desired constant brightness.

51. A method of stabilizing the brightness of a visible image developed by an imaging device in an X-ray system comprising the steps of:

opening a shutter mechanism in a camera for predetermined time intervals;

providing a first signal having a value representative of the brightness of the visible image;

integrating the first signal over each predetermined time interval to provide an integrated signal having a value proportional to the instantaneous brightness of the visible image;

developing a constant level reference signal having a value representative of a desired visible image brightness;

developing a comparison signal having a value representative of the relative value of the integrated signal and the constant level reference signal; and, applying a control signal to an X-ray source which varies in accordance with the value of said comparison signal.

52. In an X-ray system having an X-ray source, an X-ray source control circuit for varying a signal applied to said X-ray source, imaging means positioned to receive at least a portion of the X-rays emitted by the X-ray source for converting the received X-rays into a visible image, and a control system for stabilizing the brightness of a said visible image and comprising:

light responsive means disposed to receive light energy emitting from said imaging means for providing a first signal having a value representative of the brightness of a said visible image;

reference circuit means for developing a constant level reference signal having a predetermined value with respect to ground representative of a selected image brightness level;

comparator circuit means connected to said light responsive means and to said reference circuit means for comparing said first signal with said constant level reference signal to provide an error signal representative of a difference between the brightness of said visible image and a selected image brightness level;

output means coupled to said comparator circuit means for applying to the X-ray source control circuit a control signal which varies in accordance with said error signal to thereby produce a visible image having a constant selected image brightness;

said imaging means comprises an image intensifier; and, said control system includes analog circuit means coupled to said light responsive means for providing an analog signal having a value proportional to the value of a said first signal, and said comparator circuit means is coupled to said analog circuit means to receive a said analog signal.

53. An apparatus as defined in claim 52 wherein said light responsive means includes circuit means for providing a said first signal having a value which is proportional to the instantaneous brightness of a said visible image.

* * * * *